United States Patent [19]

Watanabe

[11] Patent Number: 5,415,690
[45] Date of Patent: May 16, 1995

[54] COATING COMPOSITION

[75] Inventor: Koji Watanabe, Kawasaki, Japan

[73] Assignee: Nikon Corporation, Tokyo, Japan

[21] Appl. No.: 71,272

[22] Filed: Jun. 4, 1993

[30] Foreign Application Priority Data

Jun. 12, 1992 [JP] Japan .................... 4-152531

[51] Int. Cl.$^6$ ............................. C09D 183/00
[52] U.S. Cl. ................... 106/287.16; 106/287.12; 106/287.13; 106/287.14; 106/287.15; 427/164
[58] Field of Search ............... 106/287.12, 287.13, 106/287.14, 287.15, 287.16; 427/164

[56] References Cited

U.S. PATENT DOCUMENTS

| | | | |
|---|---|---|---|
| 3,308,088 | 3/1967 | Wada et al. | 260/33.4 |
| 4,304,693 | 12/1981 | Boberski et al. | 260/17 R |
| 4,390,373 | 6/1983 | White et al. | 106/287.12 |
| 4,500,669 | 2/1985 | Ashlock et al. | 524/440 |
| 4,680,232 | 7/1987 | Factor et al. | 428/412 |
| 4,814,017 | 3/1989 | Yoldas et al. | 106/287.12 |
| 4,835,023 | 5/1989 | Taniguchi et al. | 428/15 |
| 4,895,767 | 1/1990 | Mori et al. | 428/447 |
| 5,094,691 | 3/1992 | Watanabe et al. | 106/286.4 |
| 5,116,644 | 5/1992 | Asai et al. | 427/164 |
| 5,181,141 | 1/1993 | Sato et al. | 359/580 |
| 5,188,667 | 2/1993 | Watanabe et al. | 106/286.4 |

FOREIGN PATENT DOCUMENTS

| | | |
|---|---|---|
| 0525215 | 2/1993 | European Pat. Off. . |
| 4035418 | 5/1991 | Germany . |
| 52-11261 | 1/1977 | Japan . |
| 53-111336 | 9/1978 | Japan . |
| 59-155437 | 9/1984 | Japan . |
| 3-72302 | 3/1991 | Japan . |

OTHER PUBLICATIONS

Patent Abstracts of Japan, vol. 9, No. 1 (P-1), Jan. 5, 1985 (JP-A-59 155 437).
Database WPI, Derwent Publications Ltd. AN-7-8-14593, (JP-A-53 001 230, Jan. 9, 1978).
Database WPI, Derwent Publications Ltd. AN-9-1-263167, (JP-A-3 172 369, Jul. 25, 1991).

Primary Examiner—Karl Group
Attorney, Agent, or Firm—Shapiro and Shapiro

[57] ABSTRACT

There is disclosed a coating composition, capable of providing a molded plastic article with a coated film excellent in scratch resistance, surface hardness, flexibility, transparency, antistatic performance, heat resistance, moisture resistance, chemical resistance etc. and also capable of showing excellent performance such as pot life, each of use and ease of coating. The coating composition comprises an organic silicon compound represented by $R^1_a R^2_b Si(OR^3)_{4-(a+b)}$ and a metal complex represented by $M[CH_2N(CH_2COO)_2]_2Na_c$.

16 Claims, No Drawings

COATING COMPOSITION

BACKGROUND OF THE INVENTION

1. Field of the Invention

The present invention relates to a coating composition for a molded plastic article, and more particularly a coating composition for protecting the molded plastic article.

2. Related Background Art

Molded plastic articles are widely used, exploiting the advantages of light weight, ease of working, high impact strength, etc., but are associated with drawbacks of insufficient hardness and easy scratching, susceptibility to solvents, tendency of charging causing dust absorption and insufficient heat resistance. Molded plastic articles thus have been inferior to molded inorganic glass articles for the use in spectacle lenses and window panes.

For this reason it has been proposed to apply a protective coating to the molded plastic articles, and many coating compositions have been proposed for this purpose.

Such proposals include, for example, "a coating composition containing an organic silicon compound or a hydrolyzed product thereof as a principal component (resinous component or film forming component)" which is disclosed in the Japanese Patent Laid-Open Application No. 52-11261 and which has expected to provide a hard coating similar to an inorganic coating. This composition is commercially utilized for spectacle lenses.

However, since this composition is still unsatisfactory in scratch resistance, there has been proposed, for example, a composition additionally containing colloidal silica sol, as disclosed in the Japanese Patent Laid-Open Application No. 53-111336, and this composition is also commercially used for spectacle lenses.

However, such conventional coating compositions have been associated with a drawback of unsatisfactory performance of the coating film.

SUMMARY OF THE INVENTION

In consideration of the foregoing, a principal object of the present invention is to provide a coating composition adapted for use on a molded plastic article coated film, such as scratch resistance, surface hardness, abrasion resistance, flexibility, transparency, static resistance, heat resistance, moisture resistance, chemical resistance etc., and which further offers excellent manufacturing-related characteristics such as pot life, ease of use, ease of coating, etc.

The above-mentioned object can be attained, according to the present invention, by a coating composition comprising:

(a) an organic silicon compound represented by a general formula:

wherein:

$R^1$ stands for a functional radical or an organic radical with 4 to 14 carbon atoms containing an unsaturated double bond;

$R^2$ stands for a hydrocarbon or halogenated hydrocarbon radical with 1 to 6 carbon atoms;

$R^3$ stands for an alkyl, alkoxyalkyl or acyl radical with 1 to 4 carbon atoms;

a is 0 or 1, b is 0, 1 or 2 and a+b is 1 or 2, or a hydrolyzed product thereof; and (b) a metal complex represented by a general formula:

$$M[CH_2N(CH_2COO)_2]_2Na_c \qquad (IV)$$

wherein:

M stands for Zn, Mn, Mg, Fe, Cu, Co, Ca, Bi or Al; and c is 1 or 2.

Explanation of the Component (a)

Among the compounds of the general formula (I), there are preferred those containing an epoxy radical as the functional radical represented by $R^1$, and there can be employed a compound represented, for example, by the following general formula (II) or (III):

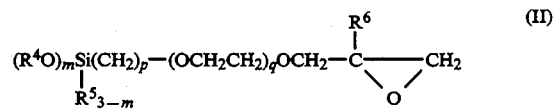

wherein:

$R^4$ stands for an alkyl, alkoxyalkyl or acyl radical with 1 to 4 carbon atoms;

$R^5$ stands for a hydrocarbon or halogenated hydrocarbon radical with 1 to 6 carbon atoms;

$R^6$ stands for a hydrogen atom or a methyl radical;

m is 2 or 3;

p is an integer from 0 to 6; and q is an integer from 0 to 2;

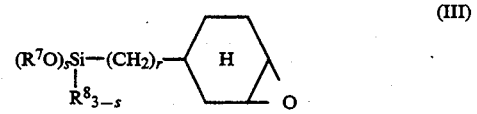

wherein:

$R^7$ stands for an alkyl, alkoxyalkyl or acyl radical with 1 to 4 carbon atoms;

$R^8$ stands for a hydrocarbon or halogenated hydrocarbon radical with 1 to 4 carbon atoms;

s is 2 or 3; and r is an integer from 1 to 4.

The compounds represented by the foregoing general formulas, having an epoxy radical therein, are called epoxysilane in general terms.

Examples of such epoxysilane include γ-glycidoxypropyltrimethoxysilane, γ-glycidoxypropyltriethoxysilane, γ-glycidoxypropyltrimethoxyethoxysilane, γ-glycidoxypropyltriacetoxysilane, γ-glycidoxypropylmethyldimethoxysilane, γ-glycidoxypropylmethyldiethoxysilane and β-(3,4-epoxycyclohexyl)ethyltriethoxysilane.

Also examples of the compounds of the general formula (I), other than those having an epoxy radical as the functional radical represented by $R^1$ but including those in which a=0, include methyltrialkoxysilanes, methyltriacyloxysilanes and vinyltrialkoxysilanes, such as methyltrimethoxysilane, methyltriethoxysilane, vinyltrimethoxysilane, vinyltriethoxysilane, vinyltriacetoxysilane, vinyltrimethoxyethoxysilane, γ-methacryloxypropyltrimethoxysilane, aminomethyltrimethoxysilane, 3-aminopropyltrimethoxysilane, 3-aminopropyltriethoxysilane, phenyltrimethoxysilane, phenyltriethoxysilane, γ-chloropropyltrimethoxysilane, γ-mercaptopropyltriethoxysilane, and 3,3,3-trifluoropropyltrimethoxysilane.

The above-cited examples of the compounds of the general formula (I) are all trifunctional having three $OR^3$ combined to Si atom (a+b=1), but corresponding bifunctional compounds having two $OR^3$ radical (a+b=2) can naturally be utilized also. Examples of such corresponding bifunctional compound include dimethyldimethoxysilane, diphenyldimethoxysilane, methylphenyldimethoxysilane, methylvinyldimethoxysilane and dimethyldiethoxysilane.

The compounds of the general formula (I) may be used singly, or as a mixture of at least two compounds according to the purpose.

In particular, when a bifunctional compound is employed, it is preferably employed in combination with a trifunctional compound. In such combined use, there is attained a relation 2>a+b>1 in average.

Furthermore, a corresponding tetrafunctional compound with a+b=0 may also be used in combination. Examples of such corresponding tetrafunctional compound include methyl silicate, ethyl silicate, isopropyl silicate, n-propyl silicate, n-butyl silicate, i-butyl silicate and sec-butyl silicate.

The compound of the general formula (I) may be used in its original form, but is preferably used as the hydrolyzed product thereof, for the purpose of increasing the reaction rate and reducing the curing temperature. In case of combined use of at least two compounds with a same number of functional radicals among the bi- to tetra-functional compounds, or in case of combined use of at least two compounds with different numbers of functional radicals, such compounds may be combined after respective hydrolysis, or may be combined at first and then hydrolyzed together. The hydrolysis liberates an alcohol $HOR^3$, and the compound of the general formula (I) is converted into a corresponding silanol:

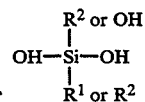

Silanol shows rapid dehydrating condensation, thus generating an oligomer. Consequently, the hydrolyzed product may be let to stand for 1 to 24 hours after hydrolysis, in order to encourage this reaction.

Explanation of the Component (b)

The compound of the general formula (IV) has a function of polymerizing the component (a), thereby forming a coated film of a three-dimensional network structure. Examples of said compound of the general formula (IV) include iron ethylenediamine tetraacetate (EDTA), aluminum EDTA, zinc EDTA, manganese EDTA, magnesium EDTA, copper EDTA, cobalt EDTA, calcium EDTA and bismuth EDTA.

The component (b) may be used not only singly but also as a mixture of at least two compounds.

The composition of the present invention may also contain sol (c) as will be explained later for the purpose of increasing the hardness, and a solvent (d) as will be explained later for the purpose of improving the flowability at the coating and the smoothness of the cured film.

Explanation of the Component (c)

There may be employed sol of inorganic particles such as of zinc oxide, silicon oxide, aluminum oxide, titanium oxide, zirconium oxide, tin oxide, beryllium oxide, antimony oxide, tungsten oxide, cerium oxide or tin oxide-tungsten oxide complex.

Such sols may be used singly, or as a mixture of at least two, if required.

In particular, titanium oxide, antimony oxide, tungsten oxide, cerium oxide, zirconium oxide or tin oxide can increase the refractive index of the composition, and the present invention provides a particularly excellent effect when such high refractive index component is employed.

The dispersion medium can be water or an organic solvent such as alcohol. The sol is preferably added with a stabilizer such as an organic amine.

The sol preferably has a particle size in a range of 1–200 nm, particularly 5–100 nm. A smaller particle size renders the manufacture difficult, also deteriorates the stability of the sol itself and is not effective enough, while a larger particle size deteriorates the stability of the coating composition, and transparency and smoothness of the coated film.

Such sols are partly already known and partly available commercially.

There may also be employed modified sol in which tin oxide particles are coated with tin oxide-tungsten oxide complex sol.

Said modified sol is a colloidal dispersion, in a dispersion medium, of "double-structured colloid particles consisting of nuclei of (1) colloid particles of tin oxide (sol), surrounded perfectly or imperfectly by (2) colloid particles of tin oxide-tungsten oxide complex (sol)". The tin oxide colloid particles (1) constituting nuclei generally have a particle size of 4 to 50 nm. The surrounding complex colloid particles (2) generally have a particle size of 2 to 7 nm. The tin oxide particles (1) constituting nuclei are positively charged. For this reason, they show coagulation (gelation) if they are mixed with the component (a), of which molecule has a negative charge because of $-SiO^-H^+$ structure. On the other hand, the complex particles (2) are negatively charged, and do not show such coagulation when mixed with the component (a).

The tin oxide-tungsten oxide complex sol is generally prepared by adding aqueous solution of sodium stannate, under strong agitation at room temperature, to aqueous solution of tungstic acid, obtained by ion exchange of aqueous solution of sodium tungstate.

The weight ratio $WO_3/SnO_2$ in the complex sol is generally with a range from 0.5 to 100. A ratio below 0.5 or above 100 provides a coated film of inferior performance when the coating composition of the present invention is prepared and coated.

The modified sol can be prepared by adding, to aqueous sol of tin oxide (1) in an amount of 100 parts by weight of $SnO_2$, aqueous sol of the complex (2) in an amount of 2 to 100 parts by combined weight of $WO_3$ and $SnO_2$ under strong agitation at room temperature. Also in this case, an amount below 2 parts or above 100 parts provides a film of inferior performance when the coating composition of the present invention is prepared and coated. The double-structured colloid particles of the modified sol generally have a particle size of 4.5 to 60 nm. The mixing of the aqueous sol of the oxide (1) and the aqueous sol of the complex (2) is estimated to cause chemical bonding of the two, and the obtained modified sol is estimated to exist stably for this reason. Such modified sol itself is already known as disclosed in the Japanese Patent Laid-Open Application No. 3-217230.

Explanation of the Component (d)

The solvent (d) is employed when required, for maintaining the coating composition in liquid state or reducing the viscosity thereof, and can for example be water, a lower alcohol, acetone, an ether, a ketone or an ester.

In the coating composition of the present invention, per 100 parts by weight (solid) of the component (a), there is employed the component (b) in an amount of 10 to 400 parts by weight, preferably 50 to 250 parts by weight, and, per 100 parts by combined weight of the components (a) and (b), the component (c) is employed in an amount of 0.0001 to 20 parts by weight.

The component (d) is employed in a suitable amount, according to the viscosity of the composition.

In addition to the foregoing components (a) to (d), there may be employed, if required, various additive materials for the purpose for example of improving the adhesion to the substrate (molded article) or improving the weather resistance, or improving the stability of the coating composition.

Examples of such additive material include pH regulating agent, viscosity regulating material, levelling agent, matting agent, dye, pigment, stabilizer, ultraviolet absorbing agent and antioxidant.

Furthermore, there may be employed in combination epoxy resin or other organic polymers for the purpose of improving the dyeability of the coated film. Examples of such epoxy resin include polyolefinic epoxy utilized for paints and for molding, alicyclic epoxy resin such as cyclopentadieneoxide, cyclohexeneoxide or polyglycidyl ester, polyglycidylether, epoxylated vegetable oil, epoxynovolac composed of novolac phenolic resin and epichlorhydrine, and glycidyl methacrylate-methylmethacrylate copolymer.

Examples of other organic polymers include polyol, cellulose resins, and melamine resin.

Furthermore, various surfactants may be employed in the coating composition, for the purpose of improving the flowability at coating and also improving the smoothness of the coated film thereby reducing the friction coefficient of the coated surface. For these purposes particularly effective is block or graft copolymers of dimethylsiloxane and alkyleneoxide, or a fluorinated surfactant.

Also in certain cases, there may be added inorganic filler such as silica sol, antimony oxide sol or fine diamond particles within an extent not contrary to the object of the present invention.

The composition of the present invention is coated particularly on a molded plastic article. In terms of the material constituting such molded article, the composition of the present invention may be coated, for example, on polymethyl methacrylate or a copolymer thereof, acrylonitrile-styrene copolymer, polycarbonate, cellulose acetate, polyvinyl chloride, polyethylene terephthalate, epoxy resin, unsaturated polyester resin, polyurethane resin, CR-39 polymer, or a plastic substrate obtained by polymerizing a monomer mixture containing at least a polyisocyanate and at least a polyol and/or at least a polythiol.

In terms of the form of the molded article, the composition of the present invention may be coated on an ingot, a wire or a film.

In terms of the function of the molded article, the composition of the present invention may be coated on optical products, particularly a lens for a camera, a spectacle lens, a mirror or a prism.

The composition of the present invention is particularly useful as an antiscratch film for a spectacle lens molded with resin of a high refractive index at least equal to $n_d = 1.53$.

In addition to the molded plastic articles, the composition of the present invention may be coated on inorganic glass, wood or metallic articles.

Coating may be achieved by ordinary coating means such as brush coating, dipping, roller coating, spin coating, spray coating or flow coating.

It is furthermore possible to coat the composition of the present invention on a mold and to pour and polymerize the material for the substrate thereby forming the molded plastic article, or to coat the composition of the present invention on a molded article, then to bring the surface of the uncured coated film in contact with a mold and to cure said coated film.

The coating composition of the present invention is turned, after coating, into a hard coated film by a heating treatment in most cases. A heating temperature of ca. 50° to 200° C., preferably 80° to 140° C. is sufficient for this purpose.

The thickness of the coated film, after drying, is generally in a range of 0.3 to 30 μm, preferably 0.5 to 10 μm.

The coated film is transparent and is excellent in hardness, particularly in scratch resistance. Thus it can prevent the deterioration of appearance and lens performance resulting from the scratches which have been the inherent drawback of the molded plastic articles, and there can be obtained molded articles of extremely high quality.

In the following the present invention will be clarified in more details by embodiments thereof, but the present invention is by no means limited by such embodiments.

As explained in the foregoing, the present invention provides a coating composition which has following features:

(1) The coated film is excellent in scratch resistance, surface hardness, abrasion resistance, flexibility, transparency, heat resistance, moisture resistance etc.;
(2) The coated film is flexible and shows little crack formation on the film surface even when the substrate is bent;
(3) The coated film shows little contraction by the curing, thus being capable of avoiding the curling trouble when coated on a thin film;
(4) The coated film is excellent in antistatic ability, thus being relatively free from smearing;
(5) The coated film has a high surface reflectance;
(6) The coated film shows satisfactory adhesion to an antireflective film or a metallic vapor deposition film;
(7) The coated film shows satisfactory sliding characteristic (low friction coefficient);
(8) The composition of the present invention has a shortened curing time;
(9) The composition of the present invention has a longer pot life;

(10) The composition of the present invention is easy to coat; and

(11) The composition of the present invention is easier for use.

DETAILED DESCRIPTION OF THE PREFERRED EMBODIMENTS

EXAMPLE 1

(1) Preparation of Preliminary Composition A 170 parts by weight of γ-glycidoxypropyltrimethoxysilane were charged in a reaction vessel provided with a rotor, and the interior of the vessel was maintained at 10° C. Under vigorous agitation with a magnetic stirrer, 40 parts by weight of 0.01N aqueous solution of hydrochloric acid were dropwise added. The cooling was terminated immediately after the end of dropwise addition, whereby a hydrolyzed product corresponding to the component (a) was obtained as homogeneous, colorless and transparent solution.

Thus obtained hydrolyzed product was subjected to the addition of 60 parts by weight of 2-propanol as the component (d), and the preliminary composition A was obtained by sufficient dissolving by mixing.

(2) Preparation of Coating Composition

The preliminary composition A prepared in (1) was charged in a glass container, and was subjected to the addition of 630 parts by weight (net solid content) of commercially available tin oxide-tungsten oxide complex sol (dispersed in methanol, average particle size 10–15 nm, tin oxide/tungsten oxide ratio=100/40 parts by weight, solid content 20%), 4 parts by weight of aluminum ethylenediamine tetraacetate as the component (c) and 0.5 parts by weight of a silicone surfactant, followed by sufficient agitation, to obtain a coating composition in the form of homogeneous, colorless and transparent solution.

(3) Coating

The above-mentioned coating composition was coated by dipping (pull-up speed of 10 cm/min) on a commercially available polyurethane spectacle lens with a refractive index of $n_d$=1.59, and was cured by heating for 2 hours at 100° C.

(4) Evaluation

The lens with the cured coated film obtained in (3) was subjected to the following tests, for evaluating the performance of the coated film:

(i) Scratch Resistance Test

Scratch resistance was tested by rubbing the film surface with steel wool #0000, and was evaluated as follows:

++ no scratch even with strong rubbing;
+ slight scratches by considerably strong rubbing;
− scratched even with weak rubbing.

The lens without the coated film was evaluated as (−).

(ii) Appearance

On the cured coated film obtained in (3), an ordinary antireflection coating was formed by vacuum vapor deposition method and evaluated as follows by visual observation of the reflected color:

++ no unevenness in the reflected color;
+ some unevenness in the reflected color;
− significant unevenness in the reflected color.

(iii) Adhesion

The lens with cured coated film was immersed in hot water of 90° C. for 2 hours. Then the coated film was cut with a knife with a pitch of 1 mm in vertical and horizontal directions to form checker board squares. Then a cellophane adhesive tape "Cellotape (trade name)" supplied by Nichiban Co., Ltd. was applied firmly, and then was rapidly peeled off in a direction perpendicular to the coated film, and the number of the checker board squares in which the coated film was peeled off was counted. The number X of such peeled squares is represented as a ratio X/100. A smaller value of X indicates better adhesion.

The results of the foregoing evaluations are shown in Table 1.

EXAMPLE 2

A coating composition was prepared and evaluated in the same manner as in the example 1, except that aluminum ethylenediamine tetraacetate was replaced by iron ethylenediamine tetraacetate.

REFERENCE EXAMPLE 1

A coating composition was prepared and evaluated in the same manner as in the example 1, except that tin oxide-tungsten oxide complex sol was replaced by commercially available silica sol (dispersed in methanol, average particle size 13±1 nm, solid content 20%).

REFERENCE EXAMPLE 2

A coating composition was prepared and evaluated in the same manner as in the example 1, except that aluminum ethylenediamine tetraacetate was not added.

The results of the evaluations on these examples are also shown in Table 1.

TABLE 1

|  | Scrach resistance | Appearance | Adhesion |
| --- | --- | --- | --- |
| Example |  |  |  |
| 1 | ++ | ++ | 0/100 |
| 2 | ++ | ++ | 0/100 |
| Reference Example |  |  |  |
| 1 | + | − | 0/100 |
| 2 | + | ++ | 0/100 |

What is claimed is:

1. A coating composition comprising:

(a) an organic silicon compound represented by a general formula:

$$R^1{}_a R^2{}_b Si(OR^3)_{4-(a+b)}$$

wherein:

$R^1$ stands for a functional radical or an organic radical with 4 to 14 carbon atoms containing an unsaturated double bond;

$R^2$ stands for a hydrocarbon or halogenated hydrocarbon radical with 1 to 6 carbon atoms;

$R^3$ stands for an alkyl, alkoxyalkyl or acyl radical with 1 to 4 carbon atoms;

a is 0 or 1, b is 0, 1 or 2, and a+b is 1 or 2;

(b) a metal complex represented by a general formula:

$$M[CH_2N(CH_2COO)_2]_2Na_c$$

wherein:
M stands for a metal, c is 0, 1 or 2; and
(c) an inorganic particle sol of at least one of titanium oxide, antimony oxide, tungsten oxide, cerium oxide, zirconium oxide or tin oxide or modified double-structured colloid particles consisting of nuclei of colloid particles of tin oxide, surrounded by colloid particles of tin oxide-tungsten oxide complex.

2. A coating composition comprising:
(a) a hydrolyzed product of an organic silicon compound represented by a general formula:

$$R^1{}_aR^2{}_bSi(OR^3)_{4-(a+b)}$$

wherein:
$R^1$ stands for a functional radical or an organic radical with 4 to 14 carbon atoms containing an unsaturated double bond;
$R^2$ stands for a hydrocarbon or halogenated hydrocarbon radical with i to 6 carbon atoms;
$R^3$ stands for an alkyl, alkoxyalkyl or acyl radical with 1 to 4 carbon atoms;
a is 0 or 1, b is 0, 1 or 2 and a+b is 1 or 2;
(b) a metal complex represented by a general formula:

$$M[CH_2N(CH_2COO)_2]_2Na_c$$

wherein:
M stands for a metal, c is 0, 1 or 2; and
(c) an inorganic particle sol of at least one of titanium oxide, antimony oxide, tungsten oxide, cerium oxide, zirconium oxide or tin oxide or modified double-structured colloid particles consisting of nuclei of colloid particles of tin oxide, surrounded by colloid particles of tin oxide-tungsten oxide complex.

3. A coating composition according to claim 1, wherein said metal is selected from the group consisting of Zn, Mn, Mg, Fe, Cu, Co, Ca, Bi and Al, and c is 1 or 2.

4. A coating composition according to claim 2, wherein said metal is selected from the group consisting of Zn, Mn, Mg, Fe, Cu, Co, Ca, Bi and Al, and c is 1 or 2.

5. A coating composition according to claim 1, wherein $R^1$ is a functional radical containing an epoxy radical.

6. A coating composition according to claim 2, wherein $R^1$ is a functional radical containing an epoxy radical.

7. A coating composition according to claim 3, wherein $R^1$ is a functional radical containing an epoxy radical.

8. A coating composition according to claim 4, wherein $R^1$ is a functional radical containing an epoxy radical.

9. A coating composition according to claim 3, wherein said inorganic particle sol has a particle size within a range from 1 to 200 nm.

10. A coating composition according to claim 4, wherein said inorganic particle sol has a particle size within a range from 1 to 200 nm.

11. A coating composition comprising:
(a) an organic silicon compound represented by a general formula:

$$R^1{}_aR^2{}_bSi(OR^3)_{4-(a+b)}$$

wherein:
$R^1$ stands for a functional radical or an organic radical with 4 to 14 carbon atoms containing an unsaturated double bond;
$R^2$ stands for a hydrocarbon or halogenated hydrocarbon radical with 1 to 6 carbon atoms;
$R^3$ stands for an alkyl, alkoxyalkyl or acyl radical with 1 to 4 carbon atoms;
a is 0 or 1, b is 0, 1 or 2, and a+b is 1 or 2; and
(b) a metal complex represented by a general formula:

$$M[CH_2N(CH_2COO)_2]_2Na_c$$

wherein:
M is selected from the group consisting of Zn, Mn, Mg, Fe, Cu, Co, Ca, Bi and Al and c is 1 or 2.

12. A coating composition comprising:
(a) a hydrolyzed product of an organic silicon compound represented by a general formula:

$$R^1{}_aR^2{}_bSi(OR^3)_{4-(a+b)}$$

wherein:
$R^1$ stands for a functional radical or an organic radical with 4 to 14 carbon atoms containing an unsaturated double bond;
$R^2$ stands for a hydrocarbon or halogenated hydrocarbon radical with 1 to 6 carbon atoms;
$R^3$ stands for an alkyl, alkoxyalkyl or acyl radical with 1 to 4 carbon atoms;
a is 0 or 1, b is 0, 1 or 2 and a+b is 1 or 2; and
(b) a metal complex represented by a general formula:

$$M[CH_2N(CH_2COO)_2]_2Na_c$$

wherein:
M is selected from the group consisting of Zn, Mn, Mg, Fe, Cu, Co, Ca, Bi and Al and c is 1 or 2.

13. A coating composition according to claim 11, wherein $R^1$ is a functional radical containing an epoxy radical.

14. A coating composition according to claim 12, wherein $R^1$ is a functional radical containing an epoxy radical.

15. A coating composition according to claim 5, wherein said inorganic particle sol has a particle size within a range from 1 to 200 nm.

16. A coating composition according to claim 6, wherein said inorganic particle sol has a particle size within a range from 1 to 200 nm.

* * * * *